United States Patent [19]

Hettinger

[11] Patent Number: 5,024,106
[45] Date of Patent: Jun. 18, 1991

[54] CONTACT SYSTEM NORMAL FORCE GAGE

[75] Inventor: Arthur C. Hettinger, Camp Hill, Pa.

[73] Assignee: AMP Incorporated, Harrisburg, Pa.

[21] Appl. No.: 492,692

[22] Filed: Mar. 13, 1990

[51] Int. Cl.⁵ ............................ G01L 1/18; G01L 5/00
[52] U.S. Cl. .................................. 73/862.54; 73/161; 73/862.68
[58] Field of Search .................... 73/161, 777, 862.01, 73/862.54, 862.65, 862.68

[56] References Cited
U.S. PATENT DOCUMENTS

| 3,266,303 | 8/1966 | Pfann | 73/862.68 |
| 3,826,130 | 7/1974 | Pusch | |
| 4,246,783 | 1/1981 | Steven et al. | 73/161 |
| 4,380,171 | 4/1983 | Smith | 73/862.54 X |
| 4,667,512 | 5/1987 | Buddwalk | 73/161 |

Primary Examiner—Charles A. Ruehl

[57] ABSTRACT

A force gage (10) for measuring normal forces (F) is comprised of a silicon element (12) having diffused in an edge surface (14) thereof a piezoresistive sensor area (16) which changes resistance responsive to applied stress caused by (F) acting in compression on the said silicon element.

5 Claims, 2 Drawing Sheets

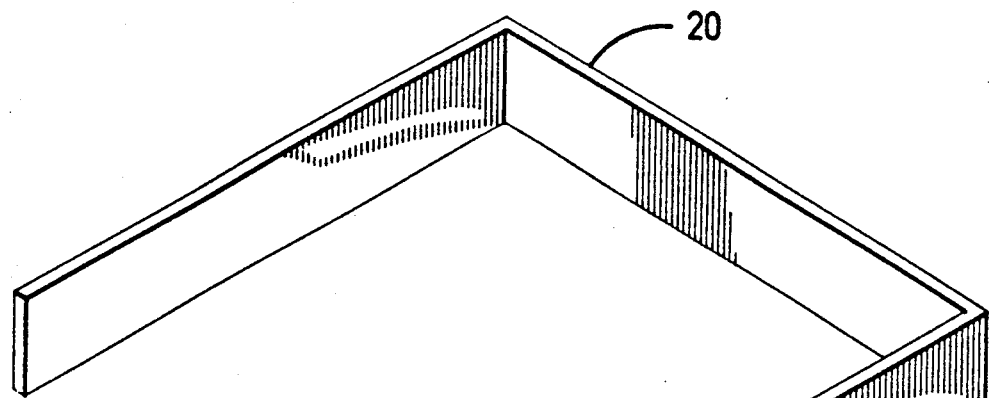
Fig. 3
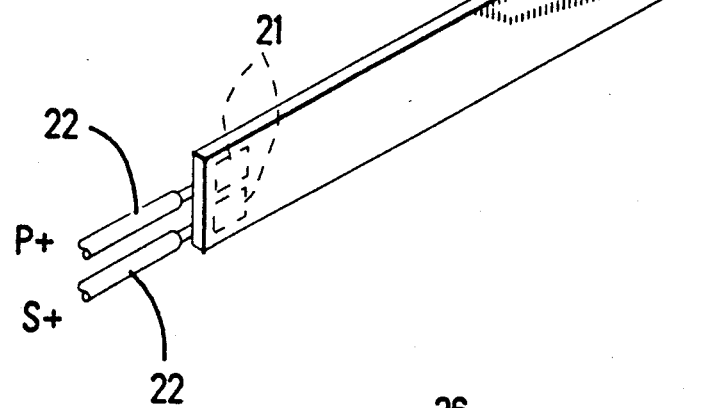
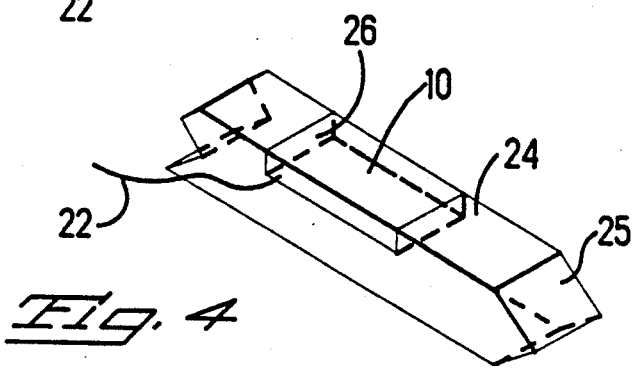
Fig. 4
Fig. 5
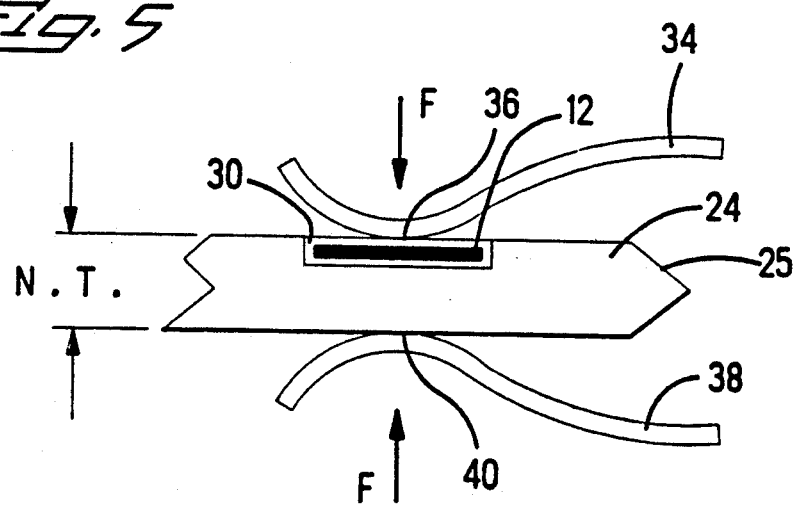

CONTACT SYSTEM NORMAL FORCE GAGE

BACKGROUND OF THE INVENTION

This invention relates to a gage to measure the normal force of an electrical contact system which includes at least one spring element.

BACKGROUND OF THE INVENTION

A key to providing good performance for electrical contacts is the provision of a normal force driving such contacts together which is adequate to provide a low resistance path between such contacts which is both repeatable and stable over the life of the contact system. Design criteria of spring systems for providing normal forces vary dependent upon the surface finishes employed with normal forces ranging between 70 and 120 grams for noble metal finishes and between 200 and 400 grams for non-noble metal finishes. Contact forces provide asperity areas of engagement of contact surfaces, break down oxide and other films which may affect current flow, and tend to minimize the effects of vibration or other movements on the circuit path established by such contacts. Current and voltage requirements to be carried by the contact system also affect these parameters.

U.S. Pat. No. 4,667,512 for a normal force transducer for receptacle contact by J. A. Buddwalk, issued May 26, 1987, details an apparatus for measuring the normal force exerted on a pin by receptacle contact wherein a thin film integrated circuit bonded to a movable beam is made to provide pairs of strain gages which are bonded to a deflecting surface and connected to a circuit to measure normal forces. The gage of the Buddwalk patent allows the testing of receptacle contacts which receive 0.025 inch square posts, and while useful in the measurement of normal forces of receptacle contacts, may be limited with respect to contacts of different geometries wherein beam deflection is not practicable.

U.S Pat. No. 3,826,130 granted July 30, 1974 to G. Pusch for an electromechanlcal power or pressure measuring transformer teaches a ceramic body which is elastically deformable in the form of a cylinder having a resistance vaporized directly thereon which is measured to reflect the changing of the cylinder longitudinally or in the periphery thereof. Force measuring devices which operate on the principle of resistive changes caused by surface deformation are generally utilized wherein loads are in the range of pounds or hundreds of pounds, not in terms of grams or fractions of pounds. Moreover, such devices rely upon the external effects of force or load resulting from deformation to the cell which, in the case of the Pusch patent, relates to the so-called elastic deformable body in the form of a cylinder.

Accordingly, it is an object of the invention to provide a gage for measuring normal forces, particularly with respect to electrical contact systems wherein one of the contacts includes a spring element. It is a further object to provide a force gage operable in the range of several hundred grams or less which utilizes the stress strain characteristics developed internally of a load element. It is yet a further object of the invention to provide a load cell fabricated by integrated circuit techniques which is useful in directly measuring the normal forces of contact systems.

SUMMARY OF THE INVENTION

In accordance with the invention, a gage for measuring the normal force of an electrical contact system is made by providing a probe or body relieved to contain a force cell comprised of a semi-conductor material, such as silicon, having on an edge surface thereof and diffused into the material of the silicon an electrically active impurity concentration having piezoresistive properties which vary as a function of stress applied to the silicon cell as carried by the probe body. The probe body carrying such cell is inserted into bearing engagement with the spring element to be tested, a voltage is applied to such cell, and variations in resistance from the piezoresistive effect are measured as by Wheatstone bridge or the internal circuit of a multi-volt meter with the reading thereof calibrated to represent grams of force bearing upon the cell caused by the contact element being tested. The force cell has an area appreciably larger than the nominal contact area of contact systems and relative to its thickness which is made quite thin. Electrodes and leads are attached to the piezoresistive diffused area of the cell, which leads are utilized to both power and develop the signal representing resistive change and therefore force units being measured. A protective frame is provided into which the force cell is fitted and terminated and the cell is carried, preferably bonded to a probe body suitable for use in engaging contact springs.

BRIEF DESCRIPTION OF THE DRAWINGS

FIG. 3 is a perspective of the cell frame which receives the cell of FIG. 1.

FIG. 4 is an end perspective in partial phantom of the probe body containing the cell of FIG. 1.

FIG. 5 is a schematic and partially sectioned view of the probe of FIG. 2 as engaged in a contact system.

DETAILED DESCRIPTION OF THE PREFERRED EMBODIMENT

Figure 1:
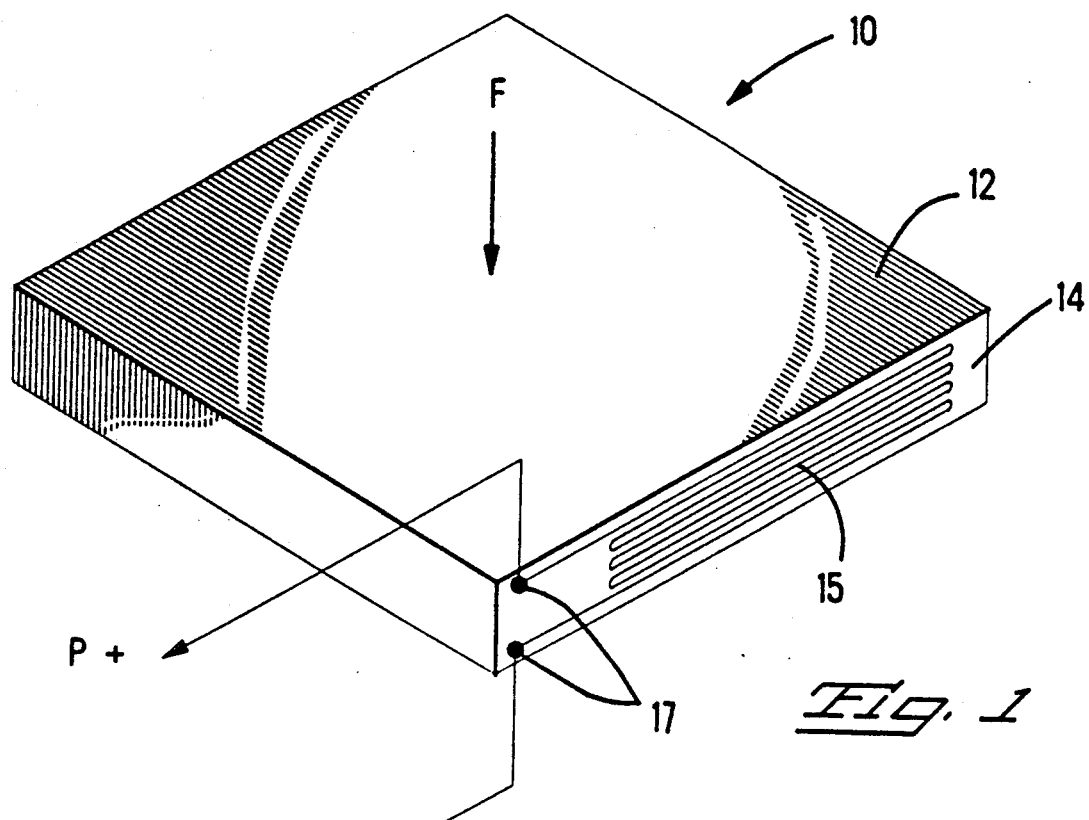
FIG. 1 is a perspective of the force cell of the invention.

Referring now to FIG. 1, a force cell 10 is shown much enlarged from actual size to include an upper surface 12 and an edge surface 14. The edge surface 14 has included diffused therein a piezoresistive material 15 terminated on the surface of edge 14 by electrodes 17. As known in the art, there are generally two classes of dopants. As reported in *Strain Gauge Technology*, edited by A. L. Window et al, published by Applied Science Publishers, 1982, "In pure silicon the carrier mobility is relatively low and therefore the resistivity of such an 'intrinsic' semiconductor is high. By adding, or doping, minute quantities of atoms from the third or fifth group in the Periodic Table to pure silicon the resistivity decreases dramatically by a factor of about 20. Two types of silicon may be produced by this process and are known as N- and P-type silicon.

(i) N-type. The diffusion of phosphorus atoms leads to conduction by negative electrons and is known as N-conduction. Materials of this type exhibit a negative gauge factor.

(ii) P-type. Diffusion of boron atoms leads to conduction by positive 'holes', or vacancies, known as P-type conduction. Materials of this type exhibit a positive gauge factor."

Since the gage of the present deals with a compression type gage, an N-type dopant, such as boron is preferred.

Returning now to the preferred embodiment hereof, such embodiment further includes a cell 10, the dimensions of the surface 12 are on the order of 0.020 by 0.040 inches with the thickness of the edge surface being on the order of 0.006 inches. Cells of this type are widely used for strain gages and details relative thereto, including the various coatings and treatment of electrode attachment, is taught in the publication "Kulite Semiconductor Strain Gage Manual," Kulite Semiconductor Products, Inc., 1039 Hoyt Avenue, Ridgefield, N.J. 07657. Reference is made to such manual for a preferred teaching of the types of gages contemplated by the invention.

With respect to the cell 10, the area 12 should be large enough to form a ready target for engagement with contact elements, or at least the spring portion thereof, for which the normal force thereof is to be measured. As is revealed in FIG. 5, the typical contact area of a contact spring is quite small, being thought of as a point contact but in fact being a series of asperity areas of a size dependent upon the softness of the material utilized for contact surfaces, the microfinish of the contact surface, and the radius of the contact. In general, the contact point of most contact systems represents a total area which is a fraction of a thousandths of a square inch. Depending on design, several contact areas, as many as two or three, may be expected.

As can also be seen by FIG. 5, there is a force shown as F which represents the normal force generated by deflection of a contact spring element in a manner to be described hereinafter. With respect to FIG. 1, the force F is shown generally centered on the upper surface 12 of the cell. That force creates an applied stress which causes a resistance change in the diffused material in the edge 14.

Figure 2:
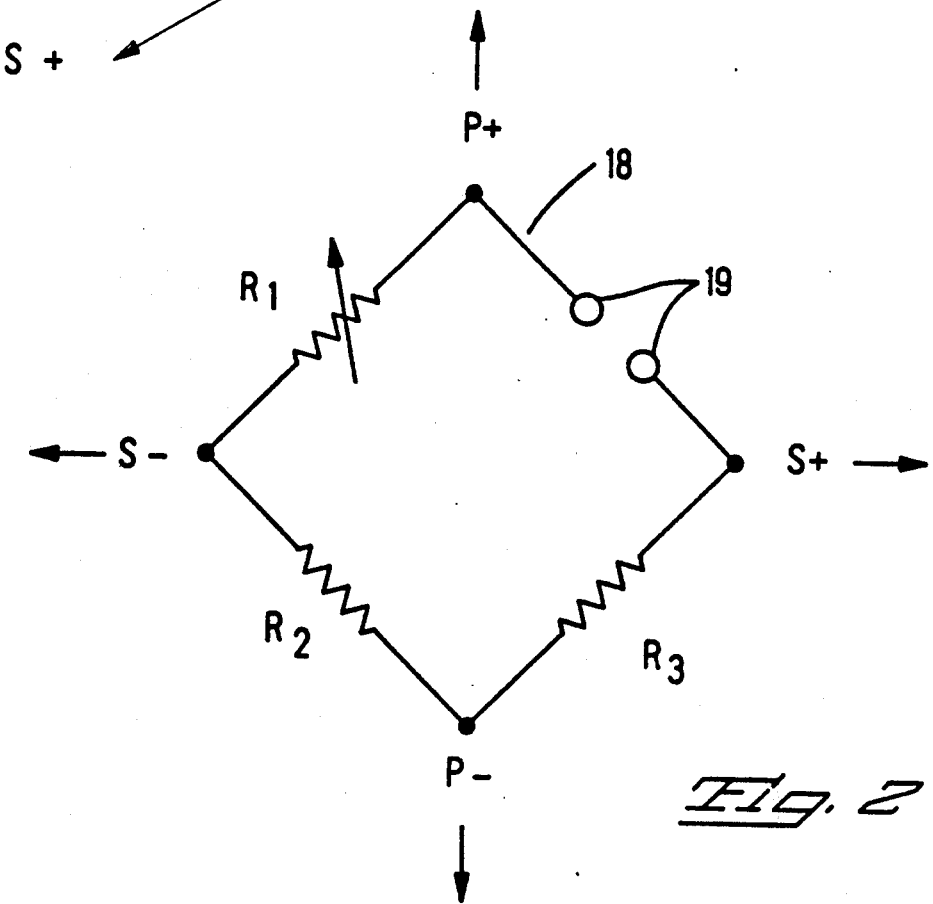
FIG. 2 is a schematic view of a Wheatstone bridge circuit useful with the invention.

FIG. 2 illustrates a Wheatstone bridge having a series of resistances R1, R2, and R3 generally of the same ohmic value with such resistances interconnected in the manner shown to pairs of leads P+, P−, S+, and S− representing power and signal leads for the bridge. Further leads shown as 18 terminate in electrodes 19 which are interconnected to the electrodes 17 of cell 10. In practice with the cell 10 disengaged from a contact spring, a suitable voltage is applied to the leads P+, P− via the electrodes 19 and leads 18 through the cell 10 and with the variable resistor R1 being adjusted until no voltage can be read at the electrodes S+ and S− thus balancing the bridge. With force F then applied, resistance of the cell 10 changes and the voltage at S+, S− may be read to represent force units. The bridge shown in FIG. 2 may be substituted by the internal bridge circuit of a standard digital volt meter with the leads 18 connected thereto and after initial zero calibration, a force reading made in terms of a digital count. Using procedures well understood in the art, a resistance range may be matched to a digital readout wherein each unit may be taken to represent a gram of force and readings readily made as an output representing normal forces of spring systems.

FIG. 3 shows a cover 20 which is typically formed of plastic film material such as Kapton, Kevlar, or Mylar into which can be fitted the cell 10 and suitably bonded thereto to facilitate handling of the cell and provide protection during such handling. The frame 10 may be made to include interiorly thereof, as indicated in FIG. 3, a pair of metallic electrode surfaces 21 formed thereon as by depositing or lamination connected to electrode leads 22 used to power the cell 10 and receive signals therefrom.

FIG. 4 shows a probe body 24 relieved as at 26 to receive a cell 10 fitted therein and bonded therewithin. The probe body may be formed of a suitable material such as stainless steel or phosphor bronze machined to have a precise thickness dimension, shown as NT relative to FIG. 5. This thickness dimension simulates the thickness of a mating contact such as a pin or post relative to a contact system structured in the manner shown in FIG. 5. The leading edge of the probe 24 is beveled or rounded as at 25 to facilitate insertion between contact elements to be tested.

In FIG. 5, the probe 24 is shown inserted between a pair of spring contact elements 34 and 38 to a degree that the upper contact element 34 containing a contact point area 36 rests generally centered upon the force cell 10. As indicated in FIG. 5, the force cell 10 is covered by a material shown as 30 flush with the upper surface of the probe body, such covering being formed of glass-filled epoxy or the like having characteristics to allow the transmission of the force F to the cell. The lower spring element 38 is shown as having a contact point area 40 bearing on the underside of body 24. It is the force F that is sought to be measured as a measure of the characteristics of the spring 34. As heretofore mentioned, it is this normal force F that is a criteria defining acceptability of normal spring forces and of a contact system.

It is contemplated that the four-cell concept of the invention may be utilized in applications wherein there is only a single contact spring such as 34 with the lower or supporting surface being formed by plastic or other means, including a flat rigid surface suitable for resisting displacement of probe 24 and holding the contact force F generated by spring 34.

I claim:

1. A gage for measuring the normal force of a contact system of the type having at least one force generating spring element oriented to be engaged by a mating contact surface inserted along a given axis transverse to the axis of the said normal force, the improvement comprising a gage body adapted to be driven along said axis to operably engage a spring contact member under test, the said body having a relief in the upper surface thereof, a gage element fitted within said relief flush with the upper surface of said body, the said element including a slice of silicon material positioned to receive in compression bearing engagement the spring contact member under test, the said slice further including along an edge thereof an area of piezoresistive material diffused into the silicon material with electrodes joined to said piezoresistive material, first means to energize said piezoresistive material with a voltage and second means adapted to measure the voltage drop caused by the loading of said silicon slice whereby to measure the normal force of said spring contact member bearing upon said silicon material.

2. The gage of claim 1 wherein said silicon material has an area on the order of 0.020 by 0.040 inches in dimension and a thickness on the order of 0.006 inches defining the edge of said slice of silicon.

3. The gage of claim 1 wherein said second means includes a Wheatstone bridge.

4. The gage of claim 1 wherein there is further including a holder fitted around said slice of silicon containing electrodes joined to the edge of said silicon to interconnect said piezoresistive area.

5. A gage for measuring normal forces of the type developed by spring elements including in combination a gage body of metal of a thickness approximating the nominal dimension of a terminal engaging the contact spring element in use, a relief within said body and a gage element fitted within the volume of said relief and flush with the upper surface thereof including a planar slice of silicon having an upper area broader than the thickness thereof to receive the contact spring under test bearing normally thereupon, a piezoresistive circuit means diffused into the material of said silicon along one edge thereof, and first means to apply voltage to said piezoresistive circuit with second means to measure the changes in resistivity as a function of the normal force applied to said silicon slice by virtue of engagement with said contact spring under test.

* * * * *